April 7, 1970  S. A. ANDREWS ET AL  3,504,538
ELECTRICAL PULSE TRANSMITTING APPARATUS
Filed Sept. 27, 1967  3 Sheets-Sheet 1

INVENTORS
STUART A. ANDREWS.
MORGAN W. LEWIS.

3,504,538
ELECTRICAL PULSE TRANSMITTING APPARATUS

Stuart Alexander Andrews, Elstree, and Morgan Wynne Lewis, Bushey Heat, England, assignors, by mesne assignments, to Rolls-Royce Limited, Derby, England, a British company
Filed Sept. 27, 1967, Ser. No. 670,881
Claims priority, application Great Britain, Sept. 27, 1966, 43,119/66
Int. Cl. G01l 3/10
U.S. Cl. 73—136          8 Claims

ABSTRACT OF THE DISCLOSURE

Electrical pulse-transmitting apparatus for determining changes in relative rotational positions of two continuously rotatable coaxial members, connected to axially spaced points in a torque shaft wherein the two rotatable members have equal numbers of circumferential teeth and are surrounded by annular stators which have equal numbers of circumferential teeth and are associated with pick-up coils by which electrical pulses produced by changes in magnetic flux in the stators are transmitted to apparatus analysing the phase relationship between the pulses from the two coils.

---

Figure 1:
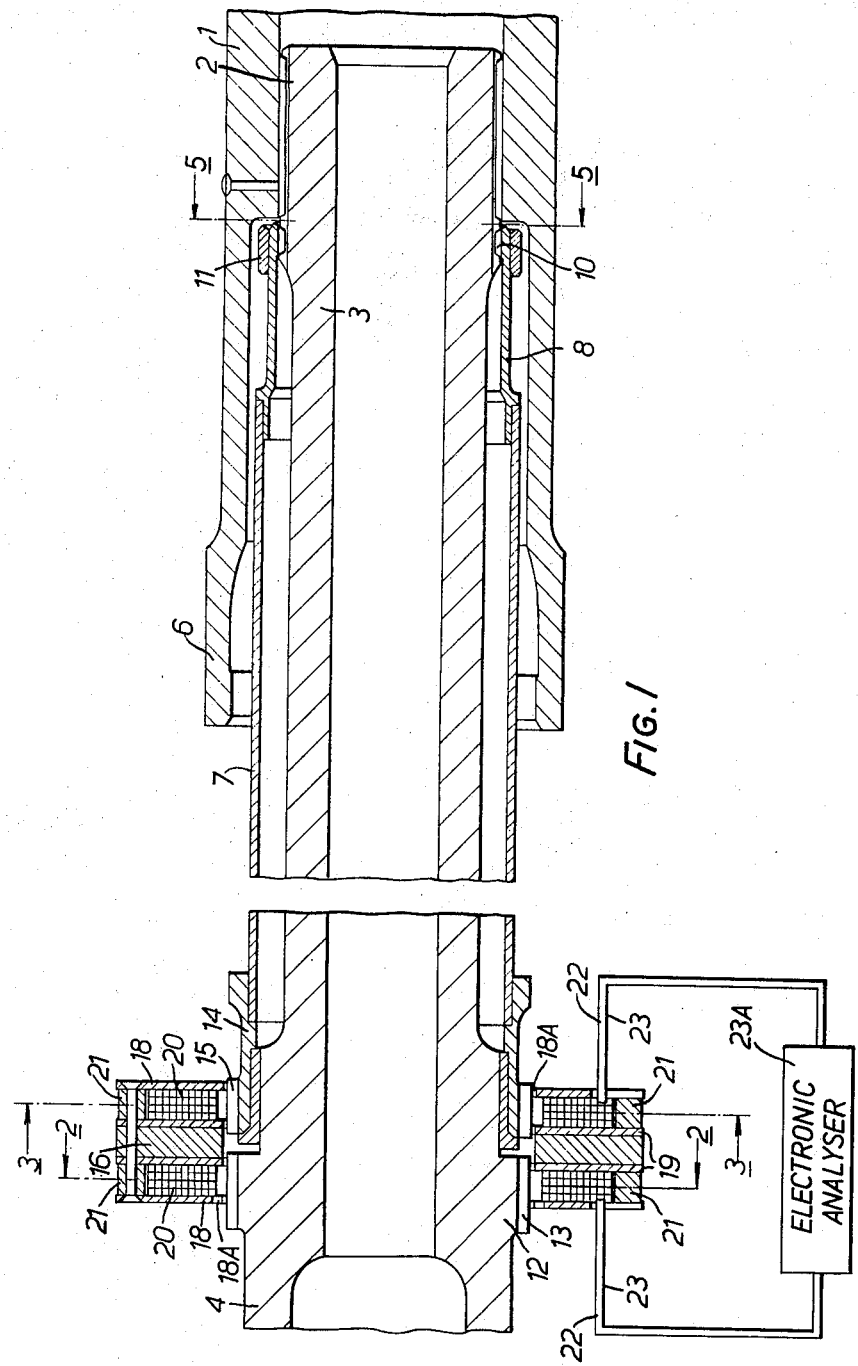

This invention relates to electrical pulse transmitting apparatus for use in determining changes in the relative rotational positions of two continuously rotatable coaxial members by measuring changes in phase between the pulses transmitted by electromagnetic pick-up devices associated respectively with the two rotatable coaxial members, and is particularly but not exclusively applicable to electrical pulse transmitting apparatus for use in torque meters of the kind in which the two continuously rotatable coaxial members are connected at axially spaced points to a torque shaft subject to the torque to be measured so that the degree of relative rotational movement between the two continuously rotatable coaxial members corresponds to changes in the torque transmitted.

Pulse transmitting apparatus of various kinds has been proposed for the above purpose, and it is an object of the present invention to provide an improved form of such pulse transmitting apparatus which will lend itself to accurate measurement of the degree of relative rotational movement which occurs between the continuously rotatable coaxial members.

To this end electrical pulse transmitting apparatus according to the present invention for determining changes in the relative rotational positions of two continuously rotatable coaxial members comprises rotary members connected respectively to the two rotatable members and each in the form of a ring of magnetic material having a circumferentially extending row of equally spaced teeth, an annular stator of magnetic material coaxial with each rotary member and also provided with a circumferentially extending row of equally spaced teeth lying adjacent to the teeth on the associated rotary member, and electromagnetic pick-up means (hereinafter referred to for convenience as a pick-up) associated with each stator and arranged to transmit through associated electrical conductors a series of electrical pulses resulting from changes in magnetic flux in its associated stator as its associated rotary member rotates.

Preferably each pick-up comprises an annular axially polarized magnet, formed as a continuous ring or in two or more segments, disposed coaxially with its associated stator, and at least one annular pick-up coil arranged coaxially with the stator and magnet.

Moreover the two stators, their associated magnets and pick-up coils are conveniently rigidly connected to one another in coaxial relationship so as to avoid as far as possible any risk of the two stators and pick-ups moving relatively to one another about the common axis of rotation of the two rotary members due, for example, to mechanical and/or thermal distortion.

The number of teeth on each rotary member may in some cases be the same as, or a multiple of or exactly divisible by, the number of teeth on each stator so that the number of pulses transmitted by each pick-up during each revolution of the associated rotary member is equal to the number of teeth in that one of the two circumferential rows having the greater number of teeth. Alternatively the number of teeth on each rotary member may be different from, and not a multiple of or exactly divisible by, the number of teeth on each stator so that the number of pulses transmitted by each pick-up during each revolution of the associated rotary member is a multiple of the number of teeth on the rotary member or its associated stator. Moreover in the latter case in a preferred example each rotary member has one more or one less tooth than each stator, so that the number of pulses transmitted by each pick-up during each revolution of each rotary member is the product of the number of teeth on the rotary member multiplied by the number of teeth on the stator.

It will be apparent that for given over all dimensions including approximate tooth dimensions the former arrangement will provide pulses of relatively large amplitude but few in number per revolution, compared with the latter arrangement which will provide pulses of relatively small amplitude but considerably greater in number per revolution. It is thus possible to employ one arrangement or the other according to whether it is desired to have comparatively high amplitude pulses for feeding to the electrical analysing apparatus which determines and indicates the phase relationship between the pulses from the two pick-up devices and tolerate the fact that small degrees of relative rotation between the two rotary members will only result in relatively small phase changes between the pulses, or to have a large number of pulses of small amplitude per revolution for feeding to the analysing apparatus and tolerate the fact that analysing apparatus sensitive to such small amplitude pulses will tend to be more sensitive than that designed to analyse pulses of large amplitude, while it will tend also to be more influenced by any affects on the pulse transmission which may occur due to vibration or other causes.

When the invention is applied to a torque meter the two rotary members conveniently lie adjacent to one another and adjacent to the same end of a torque shaft, to which end one of the rotary members is directly attached, while the other rotary member is connected to the other end of the torque shaft by means of a tubular member which surrounds and is coaxial with the torque shaft. In this case the tubular member may be connected to the torque shaft by coupling means comprising external splines on the torque shaft engaging internal splines on the appropriate end portion of the tubular member, which end portion is split longitudinally, and a clamping ring surrounding the split internally splined portion of the tubular number and maintaining the splines within the tubular member in close engagement with the splines on the adjacent end of the torque shaft. In such a construction, in which the clamping ring may be an unsplit ring closely surrounding and gripping the split part of the tubular member as by being shrunk on to it, not only is backlash between the internally splined end of the tubular member and the plines on the torque shaft prevented but the axial length of the internal splines on the tubular member and/or the external splines on the torque shaft can be short so that the length of the part of the torque shaft extending between its effective points of connection respectively to the two rotary members can be exactly determined.

The two rotary members will in any case conveniently be provided with parts having coaxial interengaging surfaces serving to support the two rotary members in coaxial relationship with one another while permitting the required degree of relative rotational movement.

Figure 2:
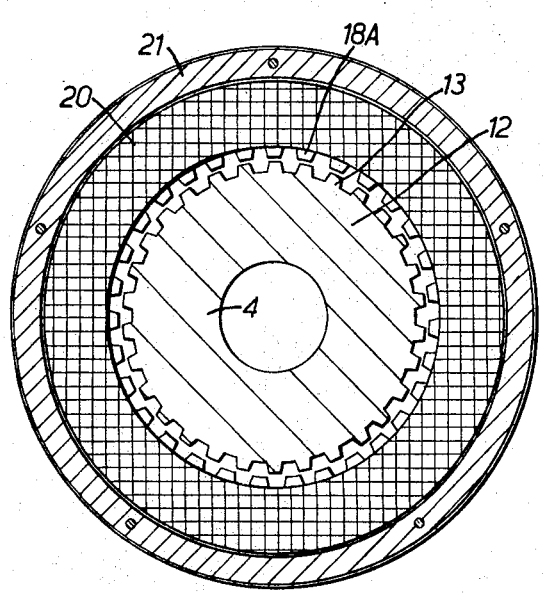
Figure 4:
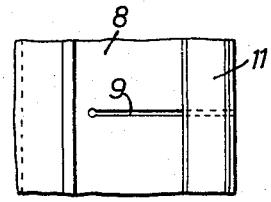
Figure 3:
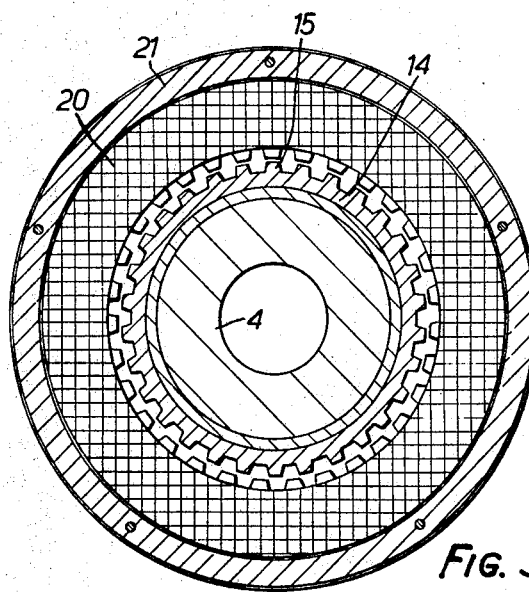
Figure 5:
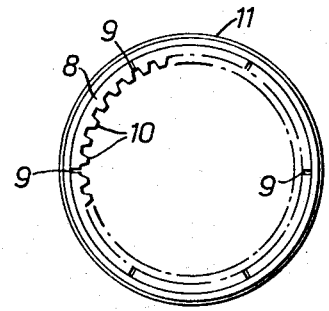
Figure 6:
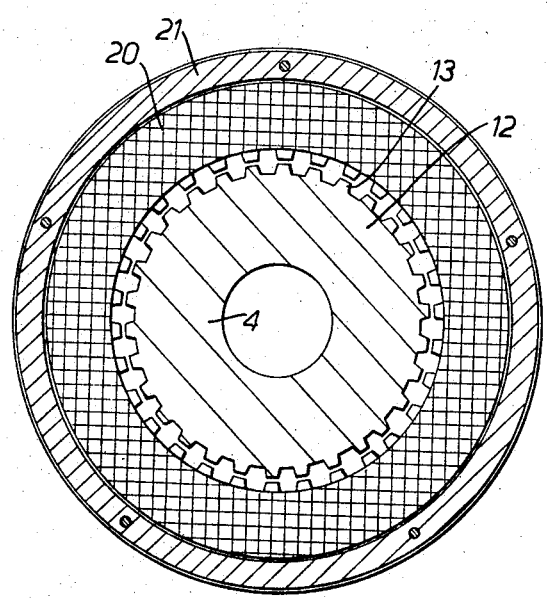

One construction according to the invention as applied to a torque meter is shown by way of example in the accompanying drawings, in which:

FIGURE 1 is a sectional side elevation of one form of pulse-transmitting apparatus according to the invention as applied to a torque meter, FIGURE 2 is a cross-section on the line 2—2 of FIGURE 1, FIGURE 3 is a cross-section on the line 3—3 of FIGURE 1, FIGURE 4 is a cross-section on the line 5—5 of FIGURE 1, FIGURE 5 is a side elevation showing a detail of the arrangement shown in FIGURE 4, and FIGURE 6 is a cross-section similar to FIGURE 2 showing a modified form of the invention.

In the construction shown in FIGURES 1, 2, 3, 4 and 5 the pulse transmitting apparatus is applied to a torque shaft assembly comprising a hollow driving shaft 1 connected by internal splines to splines 2 on one end of a hollow torque shaft 3 the other end of which is integral with a driven shaft 4. The driving shaft 1 has a tubular extension 6 into which extends freely one end of a tubular member 7. Rigid with, and forming in effect part of the tubular member 7 within the extension 6 is a tubular coupling element 8 which is split longitudinally at 9 as shown in FIGURES 4 and 5 and provided with a short ring of internal splines 10 engaging the adjacent ends of the splines 2. Shrunk onto the end of the coupling element 8 is a ring 11 which serves to maintain the splined end of the part 8 in close engagement, without backlash, with the splines 2.

Formed at the left hand end of the torque shaft 3 where it joins the driven shaft 4 is a rotary member in the form of a shallow flange 12 having formed thereon a circumferential row of equally spaced teeth 13, while there is attached to the end of the tubular member 7 adjacent to the flange 12 a rotary member 14 provided with a circumferential row of equally spaced teeth 15 equal in number to the teeth 13.

It will thus be seen that the torque shaft 3 transmits torque from the driving shaft 1 to the driven shaft 4 and that changes in the torque transmitted will cause corresponding changes in the relative rotational positions of the flange 12 and the part 14 and hence of the teeth 13 and 15. Moreover, the short axial length of the internal splines 10 enables the effective axial length of the torque shaft 3 to be determined with accuracy while, backlash between the engaging splines 10 and 2 being prevented, the rotational position of the flange 12 relatively to the part 14 at any moment during transmission of torque as compared with the relative rotational position of these parts under zero torque conditions tends to be an accurate measure of the torque being transmitted.

The shaft 4 and hence the flange 12 and teeth 13 are of steel, as also are the member 14 and its teeth 15, and the two circumferential rows of teeth 13 and 15 are surrounded by a station assembly comprising two pick-up units rigidly secured to opposite sides of a spacer ring 16 of non-magnetic material, each unit surrounding one of the rows of teeth 13 and 15. Each of the pick-up units comprises a plate 18 of magnetic material having a circumferentially extending row of equally spaced teeth 18A formed on its inner periphery, and a similar plate 19 of magnetic material without teeth, the number of teeth in each row 18A being one more or one less than the number of teeth in each of the rows 13 and 15. Interposed between each of the pairs of plates 18, 19 is an annular pick-up coil 20 surrounded by an annular axially polarized permanent magnet 21 which may be formed as a unit or in segments.

Conductors, indicated at 22, 23, from the pick-up coils 20 are provided for connection to electronic apparatus 23A which may be of known type, and by which the phase relationship between electrical pulses received respectively from the two pick-up coils 20 can be analysed and indicated so as to determine the degree, if any, to which at any moment the rows of teeth 13 and 15 have been displaced rotationally relatively to one another from their zero torque position, hence the torque being transmitted.

In the example shown, as indicated in FIGURES 2 and 3 each of the rings of teeth 13 and 15 might comprise say 30 teeth while each of the plates 18 is provided with 31 internal teeth. It will thus be seen that for each revolution of each of the rotary members 12 and 14 with their rows of teeth 13 and 15, there will be transmitted from each of the pick-up coils 20, 930 pulses (i.e. 30 multiplied by 31). Assuming, therefore, that each pulse cycle from either pick-up coil is regarded as represented by an angle of 360° a phase change of 360° between the pulses from one pick-up coil and those from the other will be produced by a twist in the torque shaft of only 0.387 degree.

In the modification shown in FIGURE 6, each of the rings of teeth 13A, 15A comprises 30 teeth while each of the plates 18 is also provided with 30 internal teeth 18B. For each revolution of each of the rotary members 12 and 14 in this construction therefore, there will be transmitted from each of the pick-up coils, 20, only 30 pulses, but for given dimensions, the pulses will be of high amplitude, compared with those provided by the construction shown in FIGURE 3. Moreover in either construction, without altering the over-all dimensions of the pulse-transmitting devices, the number of teeth on the rotary members 12 and 14, can be reduced or increased and the dimensions of each tooth thus respectively increased or reduced to provide respectively greater amplitude but less sensitivity to small changes in torque or greater sensitivity to such small changes but less amplitude, according to the requirements of any particular application. Thus, if a large number of pulses for each revolution is desired to provide large changes in phase relationship with small degrees of relative rotation between the rotary members sensitivity can be obtained in this way by employing one more tooth on each of the members 13 and 15 than on the plates 18, and/or by providing a large number of comparatively small teeth on the members 13 and 15 and the plates 18. Whereas if it is desired to provide a relatively small number of pulses of higher amplitude but at some sacrifice of sensitivity this can be achieved by employing the same number of teeth on the members 13 and 15 and the plates 18 and/or a comparatively small number of large teeth on all these members.

It will be seen that in any case the general arrangement provides for rigid connection into a single assembly of the two pick-up units in co-axial relationship with each other while moreover the rotary member 14 can be firmly held substantially concentric with the flange 12 by means of a sleeve 24 relative to which it can rotate. The risk of changes in phase relationship between the pulses from the two pick-up coils 20 due to relative displacement between various parts other than the essential relative rotational displacement between the rows of teeth 13 and 15 is thus further reduced.

What we claim as our invention and desire to secure by Letters Patent is:

1. Electrical pulse-transmitting apparatus for use in the measurement of torque comprising a troque shaft, two rotary members adjacent one another at one end of the troque shaft, one of the rotary members being directly attached to said one end of the torque shaft, while the other rotary member is connected to the other end of the troque shaft by means of a coupling member which is held in a bearing which supports it from, and coaxially with, the said one end of the torque shaft, each rotary member being in the form of a ring of magnetic material having a circumferentially extending row of equally spaced teeth, the apparatus also including an annular stator coaxial with each rotary member, and having electro-magnetic pick-up means arranged to transmit through associated electrical conductors a series of electrical pulses resulting from changes in magnetic flux as the rotary members rotate, and electrical analyzing and indicating apparatus connected to the said electrical conductors to analyze and indicate the phase relationship between the two series of pulses.

2. Electrical pulse-transmitting apparatus as claimed in claim 1, in which each pick-up means comprises an annular magnet, formed as a continuous ring or in two or more segments, disposed coaxially with its associated stator, and at least one annular pick-up coil arranged coaxially with the stator and magnet and connected to said associated electrical conductors.

3. Electrical pulse-transmitting apparatus as claimed in claim 2 in which the magnet is axially polarized.

4. Electrical pulse-transmitting apparatus as claimed in claim 1, in which the stator has teeth and the number of teeth on each rotary member is the same as or a multiple of or exactly divisible by the number of teeth on the stator whereby the number of pulses transmitted by the pick-up means during each revolution of the associated rotary member is equal to the number of teeth in the circumferential row having the greater number of teeth.

5. Electrical pulse-transmitting apparatus as claimed in claim 1, in which the stator has teeth and the number of teeth on each rotary member is different from and not a multiple of or exactly divisible by the number of teeth on the stator, so that the number of pulses transmitted by the pick-up device during each revolution of the associated rotary member is a multiple of the number of teeth on the rotary member or the stator.

6. Electrical pulse-transmitting apparatus as claimed in claim 5, in which each rotary member has one more or one less tooth than the stator so that the number of pulses transmitted by each pick-up device during each revolution of each rotary member is the product of the number of teeth on the rotary member multiplied by the number of teeth on the stator.

7. Electrical pulse-transmitting apparatus as claimed in claim 1, in which the end of the coupling member remote from the rotary member to which it is attached is connected to the torque shaft by coupling means comprising external splines on the torque shaft engaging internal splines on the appropriate end portion of the coupling member, which end portion is split longitudinally, and a clamping ring surrounding the split internally splined portion of the coupling member and maintaining the splines within the coupling member in close engagement with the splines on the adjacent end of the torque shaft.

8. The electrical pulse-transmitting apparatus as claimed in claim 1 in which the end of the coupling member remote from the rotary members is connected to the other end of the torque shaft by coupling means comprising external splines.

References Cited

UNITED STATES PATENTS

| 2,349,663 | 5/1944 | Langer | 73—136 |
| 2,824,245 | 2/1958 | Trevitt | 310—168 |
| 3,295,367 | 1/1967 | Rundell | 73—136 |

FOREIGN PATENTS

| 605,716 | 7/1948 | Great Britain. |
| 627,565 | 8/1949 | Great Britain. |

CHARLES A. RUEHL, Primary Examiner

U.S. Cl. X.R.

310—168; 336—135